United States Patent
Cappello et al.

(10) Patent No.: US 11,653,167 B2
(45) Date of Patent: May 16, 2023

(54) AUDIO GENERATION SYSTEM AND METHOD

(71) Applicant: Sony Interactive Entertainment Inc., Tokyo (JP)

(72) Inventors: Fabio Cappello, London (GB); Marina Villanueva-Barreiro, Acoruña (ES); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/841,953

(22) Filed: Apr. 7, 2020

(65) Prior Publication Data
US 2020/0329331 A1    Oct. 15, 2020

(30) Foreign Application Priority Data

Apr. 10, 2019  (GB) ................................. 1905091
Jun. 26, 2019  (GB) ................................. 1909200

(51) Int. Cl.
*H04S 7/00* (2006.01)
*H04S 3/00* (2006.01)
(Continued)

(52) U.S. Cl.
CPC ............. *H04S 7/303* (2013.01); *G06N 20/00* (2019.01); *G10H 1/0008* (2013.01);
(Continued)

(58) Field of Classification Search
CPC ......... G10L 17/08; G10L 17/24; G10L 25/51; G10L 25/18; G10L 25/78; G10L 15/063;
(Continued)

(56) References Cited

U.S. PATENT DOCUMENTS

2007/0294297 A1* 12/2007 Kesteloot .............. G06F 16/639
2012/0093343 A1*  4/2012 Batchelder ........... G11B 27/034
                                                              381/119
(Continued)

FOREIGN PATENT DOCUMENTS

EP       2148321 A1    1/2010
EP       2148321 B1    3/2015
WO    2008008425 A     1/2008

OTHER PUBLICATIONS

GB Search and Examination Report for corresponding GB 1905091. 3. 3 pages, dated Oct. 10, 2019.

(Continued)

*Primary Examiner* — Lun-See Lao
(74) *Attorney, Agent, or Firm* — Matthew B. Dernier, Esq

(57) ABSTRACT

A system for generating audio content in dependence upon an input audio track comprising audio corresponding to one or more sound sources, the system comprising an audio input unit operable to input the input audio track to one or more models, each representing one or more of the sound sources, and an audio generation unit operable to generate, using the one or more models, one or more audio tracks each comprising a representation of the audio contribution of the corresponding sound sources of the input audio track, wherein the generated audio tracks comprise one or more variations relative to the corresponding portion of the input audio track.

12 Claims, 9 Drawing Sheets

(51) Int. Cl.
    *G06N 20/00* (2019.01)
    *G10H 1/00* (2006.01)
    *G10L 15/06* (2013.01)
    *G10L 15/08* (2006.01)

(52) U.S. Cl.
    CPC .......... *G10L 15/063* (2013.01); *G10L 15/083* (2013.01); *H04S 3/008* (2013.01); *G10H 2210/056* (2013.01); *G10H 2210/086* (2013.01); *G10L 2015/088* (2013.01); *H04S 2400/01* (2013.01); *H04S 2400/11* (2013.01)

(58) Field of Classification Search
    CPC ..... G10L 15/083; G10L 19/022; G10L 19/20; G10L 2015/088; G10L 21/028; G10L 25/03; G10L 25/21; G10L 25/30; G10L 25/48; H04L 63/0861; H04L 63/10; H04L 27/103; H04H 60/27; H04H 2201/90; H04H 60/37; H04H 60/48; H04H 60/58; H04H 2201/60; H04H 60/04; H04H 60/74; H04B 7/12; H04R 29/008; H04N 5/78; H04N 5/782; H04N 5/783; H04N 5/9203; H04N 7/084; H04N 9/24; H04N 9/8042; H04N 9/8211; H04S 2400/01; H04S 2400/11; H04S 3/008; H04S 7/30; H04S 7/303

USPC ........ 381/303, 1, 98, 56–58; 700/94; 706/12
See application file for complete search history.

(56) References Cited

U.S. PATENT DOCUMENTS

| | | | |
|---|---|---|---|
| 2013/0121511 A1* | 5/2013 | Smaragdis | H04B 1/00 381/119 |
| 2013/0204616 A1* | 8/2013 | Aoki | H04M 3/566 704/226 |
| 2014/0245463 A1* | 8/2014 | Suryanarayanan | G06F 21/31 726/28 |
| 2015/0046377 A1* | 2/2015 | Sun | G10L 15/063 706/12 |
| 2016/0071526 A1* | 3/2016 | Wingate | G01S 3/802 704/233 |

OTHER PUBLICATIONS

GB Search and Examination Report for corresponding GB 1909200. 6. 3 pages, dated Dec. 22, 2019.

* cited by examiner

AUDIO GENERATION SYSTEM AND METHOD

BACKGROUND OF THE INVENTION

Field of the Invention

This disclosure relates to an audio generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The generation of increasingly high-quality audio content has become of increasing interest in recent years, in particular in the context of audio for use with virtual reality (VR) systems. An increase to the quality of audio content can be achieved in a number of ways—for example, an increase in the realism, localisation, or sound reproduction quality may each be considered to represent an increase in the quality of the audio content. Of course, such features may also be considered advantageous in the context of display/audio presentation methods other than those which are VR-based.

In some applications audio may be captured (often along with video content) and provided directly to a listener, perhaps with some mixing applied to ensure that the sound quality is suitable for reproduction. However, in other embodiments (comprising live video or computer-generated image/video content) it may be preferred to generate the audio separately. For example in a computer game it is common to generate audio that corresponds to a rendered scene, while in a movie or the like it may be suitable to generate audio that corresponds to the captured video for display.

Of course, such audio may need to be generated or have processing applied that accounts for the characteristics of the environment (the imaged real environment, or generated virtual environment) in the context of which the audio is to be provided. For example, the same sound may be reproduced in a different manner in dependence upon whether the sound source is located in a small room or in a large open space.

When providing audio content in such arrangements, it may be the case that numerous variations upon the sounds are provided in order to increase the variability of the content for a user who is likely to hear the same sound(s) multiple times. For example, numerous greetings may be recorded for a character which the user will interact with multiple times, or a number of different cheers may be recorded for a game in which the user is playing a sport within a stadium. This variability in the audio is beneficial in that the user may feel more immersed in the content—repetitive audio may become annoying to a user, or simply be seen as being indicative of virtual interactions rather than real-world ones.

It is therefore seen that an increase in the variability of the audio may be seen as improving the quality of the audio associated with an application.

It is in the context of the above problems that the present invention arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
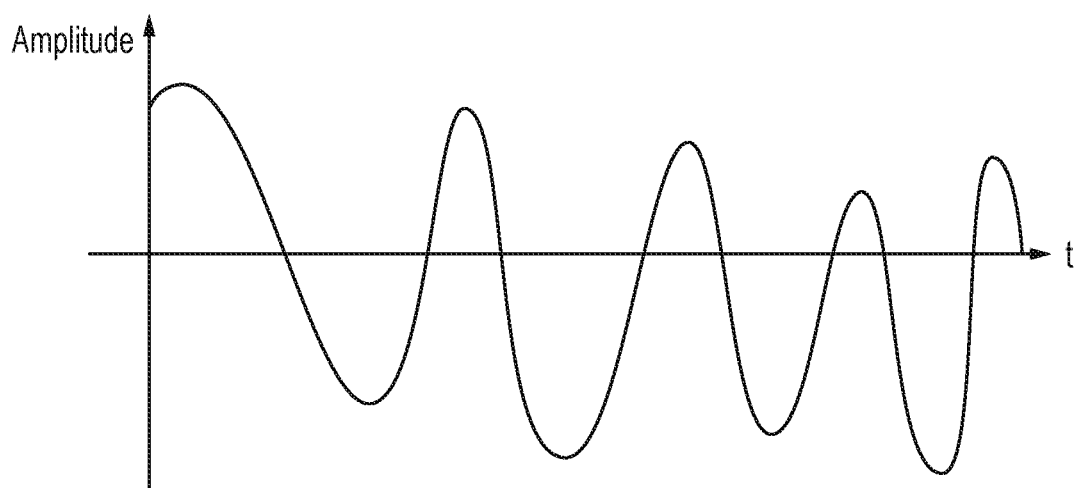
FIGS. 1a, 1b, and 1c schematically illustrate simplified output sound waves.

Referring now to the drawings, wherein like reference numerals designate identical or corresponding parts throughout the several views, a number of exemplary embodiments of the present disclosure are discussed.

It is an objective of the present disclosure to be able to provide high-quality immersive audio for a range of applications. In particular, embodiments of the present disclosure are operable to generate audio by generating modified representations of pre-existing audio such that the generated representation is more suitable for reproduction in an in-game, or other user experience, context.

Embodiments of the present disclosure provide a system and method for receiving input audio and generating a new representation of one or more component parts of the audio so as to generate output audio that represents a variation on the input audio that may produce a different overall impression on a listener. By generating representations for each of one or more sound sources within the content, localisation of the audio during playback may also be improved.

To begin with, examples of a sound separation process are described. While such a process may not be required for all embodiments, the quality of the output audio that is generated may be increased by performing processing to generate clean representations of each of one or more components of the input audio. Firstly, an example in which a simplified audio signal is to be separated is considered.

Figure 1B:
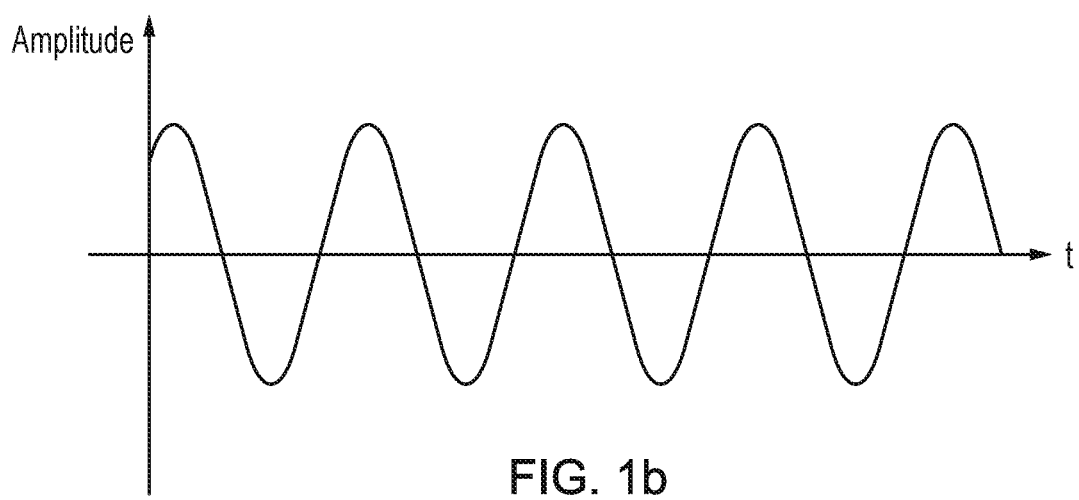
Figure 1C:
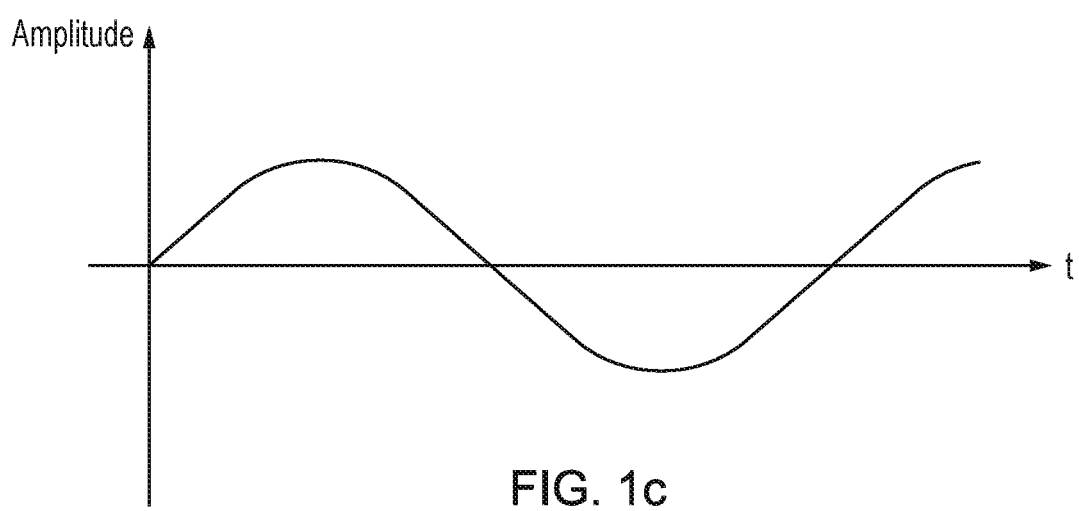

FIG. 1a schematically illustrates a composite audio signal, with amplitude of an audio output on the vertical axis and time on the horizontal. As can be seen, the amplitude of the signal varies over time in a generally sinusoidal manner. However, the signal is such that the magnitudes of each of the peaks and troughs are not constant over time. In this simplified example, the composite wave of FIG. 1a is a function of two separate component waves—these are schematically illustrated in FIGS. 1b and 1c. The varying amplitudes is apparent in FIG. 1a; for example, on the right side of the graph the troughs are greater in magnitude than the peaks in line with the oscillation shown in FIG. 1c.

While the separation of the composite wave of FIG. 1a into the component waves of FIGS. 1b and 1c appears rather simple in this example, in practice a separation is much more complicated. For example, the number of sound sources is likely to be greater than two, and each of the sound sources may have a complex frequency profile that will vary how the sounds are interpreted. In addition to this, environmental factors such as the location of sound sources in an environment or the acoustics of the recording environment may also impact this. For example, the loudness or perceptibility of one or more sounds may vary between different recording environments. In view of these complications, it is immediately apparent as to how errors and inaccuracies may be present when masking audio tracks to isolate sound sources.

For instance, there are several types of masking that can interfere with the sound separation process. A first example is that of simultaneous masking, which is when sounds overlap (that is, are received at the same time) such that one sound prevents another from being heard. This effect may further be dependent upon the relative frequencies or intensities of the audio signals. A second example is that of temporal masking, which is when sounds that immediately precede/succeed one another may cause one or more of the preceding/succeeding sounds from being audible.

Figure 2:
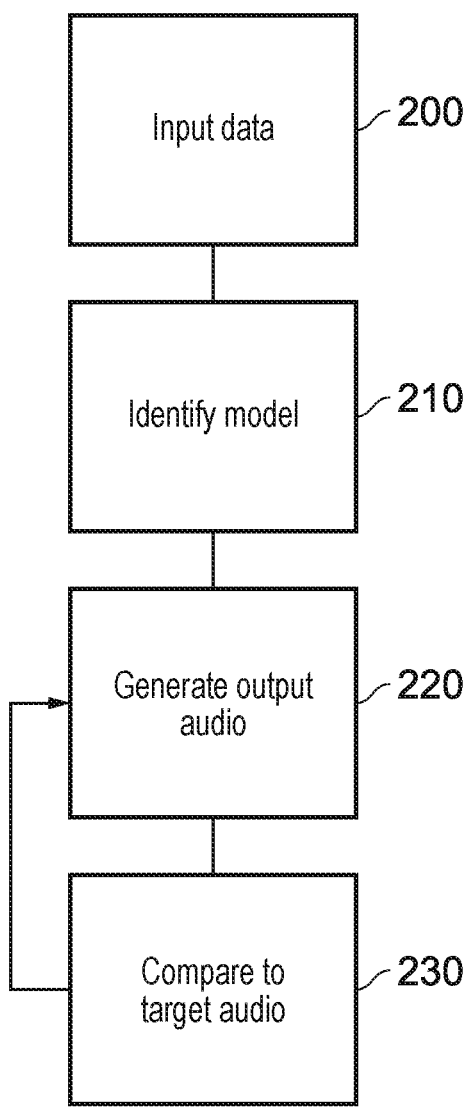
FIG. 2 schematically illustrates an audio separation/generation method.

In the present application, an alternative approach is taken in which instead of masking the existing audio track, steps are taken to generate new audio that corresponds to a desired subset of one or more of the sound sources present in the audio. That is, rather than masking all sound not corresponding to a given sound source within an audio track, a new audio track may be generated that comprises only audio corresponding to that sound source. FIG. 2 schematically illustrates such a method.

At a step 200, input data is provided. This data includes an audio track for which the audio separation/generation method is to be performed, in addition to further information such as the target element of the audio track (for example, an instrument or other sound source which is to be separated from the rest of the sound within the audio track).

At a step 210, a model to be used for the generation of audio is to be identified. This step may comprise the generation of a model, in some embodiments, and/or the provision or selection of parameters used to constrain the (or an existing) model. The model may be used to simulate the output of audio from a specific sound source, such as a particular instrument or person's voice. A more detailed discussion of sound generation models is provided below.

At a step 220, output audio is generated using the selected model or models. The generated audio should be an approximation of the contribution of the modelled sound source to the initial audio track—for example, a guitar track may be generated to approximate the guitar portion of the initial audio track.

The generated output may be in any suitable format; it is not limited to the generation of a raw audio signal in the time domain. For example the audio may be generated symbolically, such as in the form of sheet music or MIDI representations that describe audio. Audio may also be generated in the frequency domain, resulting in the output of a spectrogram from which a sound may be recovered (for example, by using a minimum phase reconstruction of the signal).

Some sound sources may be more easily replicable using specific generation methods and formats—as such, models may select the format as appropriate. For example, when generating output audio corresponding to a speech input it may be more appropriate to use a symbolic representation as the identification of words may be simpler in such a format (although of course, any suitable format may be useful).

At a step 230 the generated audio is compared to the target audio, the target audio being the corresponding portion of the initial audio track. If the comparison determines that the generated audio is not a suitable approximation of the target audio, then the processing returns to step 220 which is operable to generate a new approximation with updated model parameters (such as parameters that vary in dependence upon feedback about the differences between the generated and target audio). However, if it is determined that the generated audio is a suitable approximation of the target audio then the generated audio is output for use.

The model of the sound source that is used should comprise information that characterises that sound source. For example, when modelling a piano as the sound source information such as the sound generated when pressing each key should be included, as well as other constraints upon the sound output such as the number of keys that can be pressed simultaneously (and the spread of keys that can be pressed simultaneously/within a threshold amount of time due to user hand size/movement speed).

Of course, there may be a number of variables that need to be taken into account when utilising such a model. For instance, if two people together play a single piano then this makes a substantial difference to the constraints upon the notes that are able to be played simultaneously or in quick succession. Further modifications to increase the specificity of the model, such as those relating to a particular instrument or musician, may also be considered in order to improve the ability of the model to approximate the desired audio.

For example, modifications may include the provision of details such as information about the instrument itself (make and model, or physical characteristics, for example), how it is tuned, and/or information about the output method associated with the instrument (such as through a particular amplifier that may cause the sound to be modified in a particular manner).

Similarly, patterns in the generated audio may also be identified to assist with generating a suitable representation of the contribution of that instrument. For example, it may be identified that an instrument plays the same set of notes repeatedly and this information can be used to assist the audio generation process in parts in which the contribution of the sound source may be difficult to identify (such as in particularly loud/chaotic portions of an audio track). Similarly, this may apply if the model is able to identify the chorus of a song as this may be repetitive.

While the use of pattern identification is considered to be able to improve the accuracy of the audio generation process, this may also assist in improving the efficiency as similar portions may be simply copied from parts of the track generated at an earlier time. The amount of processing required may therefore be significantly reduced, particular in audio tracks that are considered to have a high degree of repetition.

Of course, while the discussion has been largely with respect to instruments, other sound sources may also be considered. For example, speech, animal noises, sounds of machinery or equipment (such as input devices for an entertainment device) being operated, and/or sounds output by a game or other media may also be considered to be suitable sound sources for modelling in this manner.

While a single model may be provided that is operable to identify and generate audio corresponding to any of a plurality of sound sources, in practice a plurality of models may be preferable. Models may be generated with any suitable degree of granularity; it is considered that there may be a trade-off between the quality of the audio generated by the model (or the time taken to generate the correct audio) and the range of applicability of the model.

To provide an example, a model may be provided that corresponds to all guitars; such a model should be able to identify and generate a range of different audio characteristics due to the range of guitars that exist and the difference in sounds generated by each. Alternatively, a model may be provided that corresponds to a subset of guitars; for example, acoustic or electric. This subset may be selected freely—for example, brand of the guitar, groups of similar guitars, or even individual guitars. In some cases, models could be provided that correspond to each of the strings of a guitar, a group of which could be used to represent the guitar as a whole.

In some cases, a composite model may be used wherein the model is generated in dependence upon user input (or other information, such as identification from the audio) so as to take into account a range of factors about the sound source. For instance, a custom guitar may not correspond to any of the particular models that already exist—in response to this, a custom model may be generated (using those existing models, where appropriate) in dependence upon information from a user about the specific components or similarities to components with existing corresponding models.

Once one or more models are defined that are each able to identify which sounds in an audio track may correspond to a respective desired sound source, and to be able to generate audio so as to correspond to those sounds, inputs to the model are provided in accordance with step 200 of FIG. 2.

A first input to the model may be that of the audio track which is to have one or more sound sources separated from the remaining audio. This may be an existing recording, such as a stored audio file, or may comprise live audio obtained using a microphone, for example.

Additional inputs may include information identifying the target sound source, information identifying where in the input audio track the target sound source is isolated (such as during a solo part of a song), information characterising the input audio (such as a music genre) and/or information about the recording conditions. As a possible alternative to the former, analysis could be performed to identify sound sources in the input audio track and the user may be able to select the target source from a list of identified sources.

In some embodiments, such as those in which 3D/multi-channel audio is provided, information about the location of sound sources in the recording environment may be used to assist in distinguishing sound sources from one another. This may be particularly useful when multiple sound sources of the same type are present in the environment, such as in a song with multiple guitarists or in a recording with multiple people having similar voices.

In some embodiments, the sound source model may be implemented using machine learning methods. Such methods may be particularly well-suited to this audio separation/generation method.

While any suitable method may be used, examples of machine learning based methods are provided below.

In some embodiments, discriminative algorithms may be used to compare generated audio output with the input audio track to determine whether or not the generated audio 'belongs' to the input audio track. In other words, the algorithm may compare the generated audio to the input audio to determine whether or not it can be seen to match the corresponding portion of the input audio track. In this case, the generated audio may be assigned a confidence value that is indicative of the likelihood that the audio matches the input; a threshold may be applied to confidence values to determine whether the generated audio is sufficiently close to the input audio.

While discriminative algorithms may be suitable in some embodiments, in other embodiments a generative learned model (such as a generative adversarial network, GAN) may be used. A GAN may be suitable for such methods as these are processes developed with the aim of generating data that matches a particular target; in the present case, this would equate to generating audio that matches a component (source) of the input audio track. A number of alternative methods of utilising a GAN may be employed, two of which are described below.

A first method of utilising a GAN is that of using it to train a conditional generative model. A conditional generative model is a model in which conditions may be applied, such as parameters relating to the desired outputs. In the present case, the conditions are specified by the input audio track—this comprises the information which is to be obtained, and as such the audio track includes information that can be used to guide the generation of the new audio using the model.

A second method of utilising a GAN is effectively that of 'reverse engineering' the sound output from the desired sound source. Typically, a generative model is provided with an input variable (this is a random vector during training) from which an output is generated. Of course, when a random input vector is provided, a random (yet dependent upon the input vector) output is generated.

However, in an implementation of the second method a more convergent approach may be taken. The input vector can be refined through backpropagation so that is produces an output that is increasingly similar to the corresponding audio in the audio track for which the separation is to be performed. This refinement may be defined with a loss function as the objective, as defined between the original audio track and the successive outputs of the GAN, wherein the input vector is modified iteratively so as to reduce the value of the loss function (indicating a higher degree of similarity between the output and the input audio track that is to be separated.

As the model is constrained such that it only operates for a subset of the sounds, such as a specific instrument, the output necessarily corresponds to that subset of sounds. The generated audio can therefore be considered to be an equivalent to the contribution of a sound source corresponding to the model, and as such the generated audio may be used as a track as if it had been separated from the original audio track.

In the case that multiple sound sources are desired to be separated from an input audio track, the separation method may be performed simultaneously or in any suitable order. In some examples, the order of separation may be in the order of model accuracy or efficiency—the results of one model may be used to assist a model used later to extract information about the desired sound source.

For example, once a guitar sound has been separated from the audio track, information about the separated sound may be used for the voice separation (for example, by performing a filtering to remove the guitar sound from the input audio to assist in identifying the voice component). In some embodiments this filtering may be used only in non-voice segments, so as to reduce the overall amount of information that is considered whilst maintaining a suitable level of audio quality in the initial input audio for the desired sound source.

Of course, these are only exemplary implementations; other approaches, using machine learning or otherwise, may be utilised within the framework of the present disclosure.

As an exemplary sound separation method in line with the method schematically illustrated in FIG. 2, we consider the example of the separation of a guitar track from a song comprising a number of other instruments and/or voices.

As in the step 200, the song is provided as the input data. Additionally, information may be input by the user to identify the guitar as the target sound source to be separated, however it may instead be the case that the method is performed for each sound source identified from analysis of the song.

In the next step (210), the model corresponding to the guitar used in the track is identified. This may be an automatic identification of the guitar based upon an analysis of the input song or metadata associated with the song, or may be selected by a user. As noted above, this model may be general (guitar), or more specific (specific model and/or play style), and can include factors such as the genre of music in determining the correct model.

At the step 220, the model is used to generate guitar tracks that approximate the guitar present in the input song.

In the first method described above, this comprises the specifying of the conditions that constrain the target audio—for example, the user (or an analysis of the input song) may be able to identify parts of the input song that correspond to target audio in order to guide the model in generating the desired audio.

In the second method described above, this instead comprises the determining of a correct input vector to the model; 'correct' here indicating that the input vector is used to generate a guitar track that matches (or at least clearly approximates) the corresponding guitar contribution in the input song.

At the step 230, the generated guitar track is compared to the input song; of course, this may be combined with the step 220 in some cases rather than being an entirely distinct step. Any suitable pattern-matching technique (for example) may be used. If the generated guitar track is found to match (or approximate to within a threshold variance) the guitar contribution in the input song then the generated guitar track is output as separated audio. If this is not the case, then the process returns to step 220 to generate a new guitar track that may be more suitable as a part of an iterative process.

Figure 3:
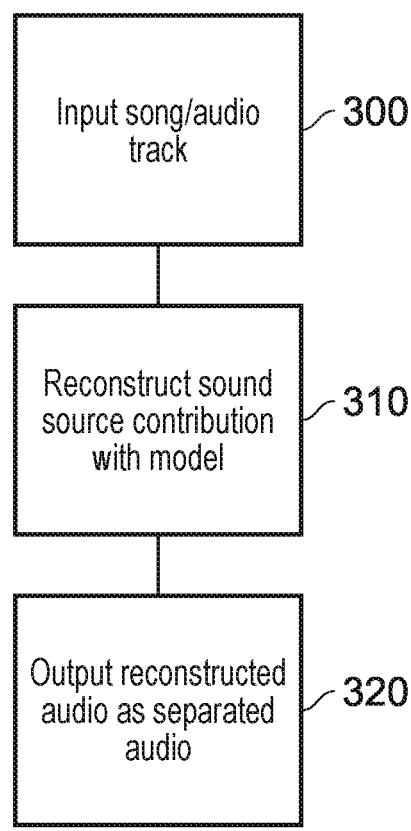
FIG. 3 schematically illustrates a further audio separation/generation method.

This may be summarised in the method shown in FIG. 3, comprising three more broadly characterised steps.

In a step 300, a song or other audio track is input.

In a step 310, sound source audio, for one or more desired sound sources, is reconstructed using a corresponding model of the sound source.

In a step 320, the reconstructed sound source audio is output as separated audio for use on a per-sound source basis (unless it is desired that audio corresponding to a plurality of sound sources are output in a single audio track).

Of course, separation of individual instrument audio tracks from input audio is not considered to be the only application of the present disclosure. In some embodiments, the objective may be to separate the speech from an individual speaker (or a group, for example in a chorus) in order to perform speech recognition, voice filtering in a noisy environment, or any other processing that may be enhanced by having a separated audio track comprising only that source of speech.

In such a case the input audio would be an audio track that contains the speech that is to be separated. This may be a spoken command to an electronic device, such as a computer-based or robotic personal assistant, or any other audio recording of speech, for example.

Constraining the model used to generate the speech may be more complex than in the case of an instrument, as the range of sounds that may be generated by a human voice can be rather high as well as having fewer physical and/or logical constraints. That is, humans are capable of generating a large number of sounds (greater than the number of notes on an instrument—for example, instruments may have constraints upon combinations of notes and logical sequencing of notes, with these constraints not being so restrictive when in the context of language.

Inputs to generate and/or select a suitable speech model may therefore include speech samples for a particular user or class of user, language-specific information (such as identifying basic sounds, syllables, and/or words), vocal range, information about accents, and/or any other information that may be used to distinguish between different sounds and/or speakers.

As noted above, there are a number of applications for the use of the separated audio content that is obtained using the described method.

A first example is that of identifying voice commands, particularly when the voice command is issued in a noisy environment. By reconstructing the audio corresponding to the input sound, it may be possible to generate an audio track comprising only the voice commands provided by a single user. This may enable a speech recognition process to more clearly identify commands, as interfering sounds (such as background noise and/or simultaneous speech from other people) may be removed (or at least substantially reduced) from the audio.

Another example is that of improved audio mixing, such as when adjusting the contribution of different instruments in a song before finalising the track. By generating the separated audio for each instrument, rather than handling the audio corresponding to all instruments simultaneously, more tailored modifications may be made to each of the different elements (that is, sound sources) of the track. This may lead to a higher-quality sound output in the finalised track, as the need to balance modifications to the audio in view of different instruments is mitigated.

A further example is that of providing an augmented reality experience in which particular sounds can be filtered out so that they are not heard by a user. For instance, this could include filtering out the sounds of nearby traffic, or of machinery in a workshop, enabling the user to hear other sounds more clearly. In a first implementation, this could be achieved by generating audio comprising the unwanted audio and subtracting this from the sound that is actually recorded. Alternatively, a second implementation could rely upon generating separated audio for each of the other sound sources that are recorded and to pass only that audio to the user.

In some cases, the disclosed method may be suitable for generating improved virtual reality content from pre-existing media. In some cases, the improved virtual media may offer an immersive experience to a user by allowing the viewpoint to be moved freely; embodiments of the present disclosure may assist in generating audio that allows such an experience to be enjoyed fully by a user whilst improving the sense of immersion. An example of this is discussed below with reference to FIGS. 4-6.

Figure 4:
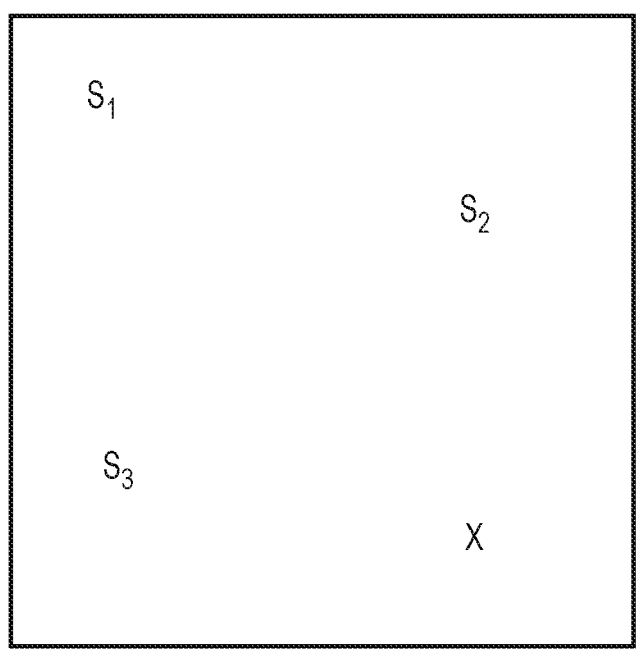
FIG. 4 schematically illustrates sound sources in a virtual environment.

FIG. 4 schematically illustrates a schematic plan view of an environment 400 in which a number of sound sources $S_1$, $S_2$, and $S_3$ are present. The environment 400 can be considered to be a virtual environment that corresponds to a real environment in which sound is captured at a microphone position X (or a virtual environment in which a virtual microphone is used as part of the sound generation process). The sound sources $S_1$, $S_2$ and $S_3$ may be any type of sound source, such as instruments, people, and/or speakers.

Figure 5:
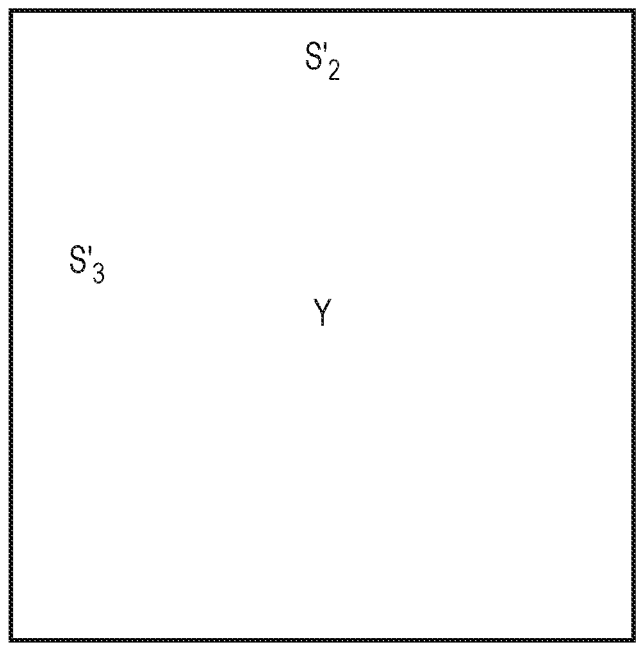
FIG. 5 schematically illustrates unmodified sound sources and a listener in a virtual environment.

FIG. 5 schematically illustrates the virtual environment 400 in which a listener Y is present. The sound sources $S_2'$ and $S_3'$ represent the perceived locations of the sound sources when the audio is presented to the listener; these differ from the positions shown for $S_2$ and $S_3$ in FIG. 4, and no sound source corresponding to $S_1$ is present in FIG. 5, due to the fact that the same audio is provided to the listener Y as was recorded at the position X. This means that the sound sources are perceived at being at the same relative positions to the listener Y as they were to the microphone X during recording (or sound generation, more generally).

This can cause a disconnect between video and audio for a user, in that the positions of elements in the video may be adjusted in view of the listener's movement within the virtual environment. This disconnect may lead to a loss of immersion, and therefore a worsening of the user experience.

Figure 6:
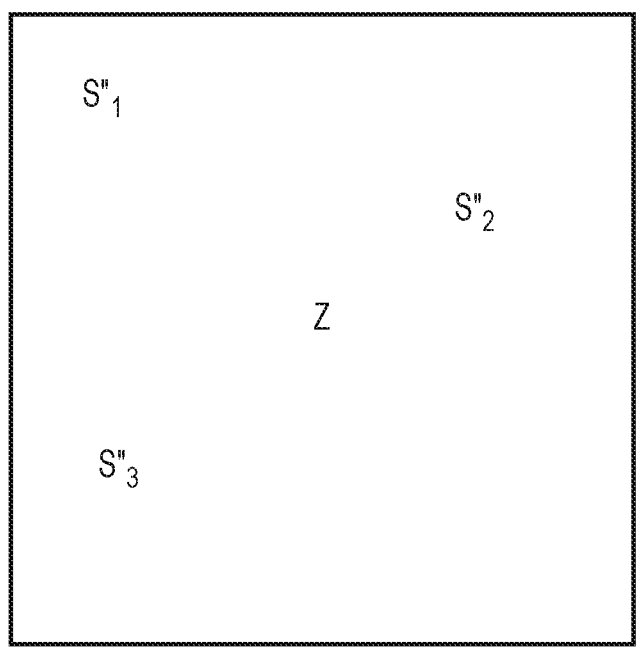
FIG. 6 schematically illustrates modified sound sources and a listener in a virtual environment.

Instead, as shown in FIG. 6, the sound sources $S_1''$, $S_2''$, and $S_3''$ should appear to be at the positions occupied by the sound sources $S_1$, $S_2$, and $S_3$ in FIG. 4. As is apparent from FIG. 6, the positions of these sound sources relative to the listener Z are different to those positions relative to the microphone as shown in FIG. 4.

Figure 7:
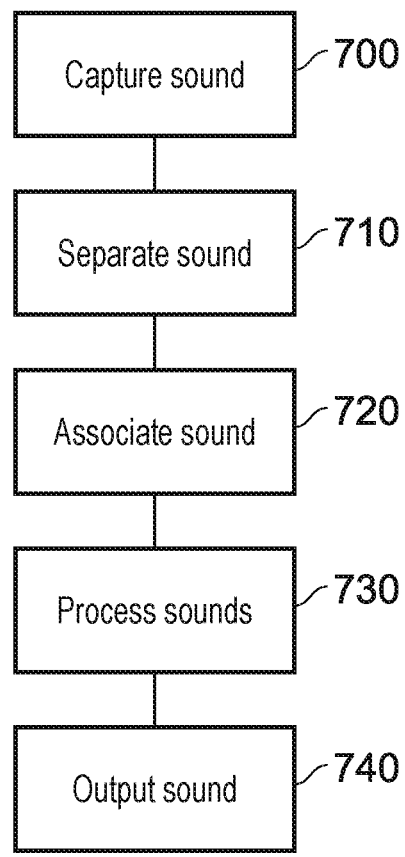
FIG. 7 schematically illustrates an audio generation method.

These varying of position may be achieved using a method according to FIG. 7, for example.

A step 700 comprises capturing or otherwise receiving a sound input. For example, this may be audio recorded (or input live) using a microphone, or an existing song or the like. In the example of FIG. 4, this step would comprise the capturing of audio from sound sources $S_1$, $S_2$, and $S_3$ with the microphone at X.

A step 710 comprises separating sound sources from the audio using a method such as those described above. The result of this process is a plurality of audio tracks (separated sounds) each corresponding to one or more sound sources in the captured audio.

A step 720 comprises associating one or more of the separated sounds with representations of corresponding sound sources in a virtual environment, and determining the location of that representation in the environment. For example, separated sounds relating to the voice of a speaker may be associated with a virtual model or image of that speaker (or any other avatar/representation), and the location of that model in the virtual environment is determined.

A step 730 comprises applying processing to one or more of the separated sounds in order to account for the position of the sound source relative to the listener in the environment. For instance, if the listener is closer to a sound source than the sound source was to the microphone in the original recording, the volume may be increased in this step. Similarly, any suitable processing may be applied to account for the change in position; in some embodiments, the sounds are modified in accordance with a head-related transfer function associated with the user for that environment. Of course, in other cases a more simplified processing may be applied to approximate the effects of a changed relative position—in such cases the processing may comprise only modifying the volume and/or apparent direction, for example.

A step 740 comprises the output of the processed separated sound to a listener. This may be performed in conjunction with displayed imagery (such as in a virtual reality experience), or may be entirely independent of displayed content—for example, an audio-only experience may be provided to a user (such as being a part of an augmented reality experience with no display component).

In accordance with this, it becomes possible to generate audio that is able to be suitably localised within a virtual environment so as to enable a user to be provided with an immersive VR experience with correct audio as the position of the user changes within the environment.

Figure 8:
FIG. 8 schematically illustrates a system for generating and outputting audio.

FIG. 8 schematically illustrates a system for generating and outputting audio, comprising an audio separation unit 800, an audio processing unit 810, and an audio output unit 820.

The audio separation unit 800 is operable to receive input audio (comprising a composite audio track), identify the contribution of a sound source to the audio track, and generate sound corresponding to that contribution.

The audio processing unit 810 is operable to perform any desirable processing to the generated audio. For example, this may comprise processing to modify the generated audio (such as audio mixing) or processing to generate audio suitable for output (such as correctly-located sound sources). Of course, in some cases this processing may be omitted and the separated audio is output directly as generated.

The audio output unit 820 is operable to output the generated/processed audio as desired.

Figure 9:
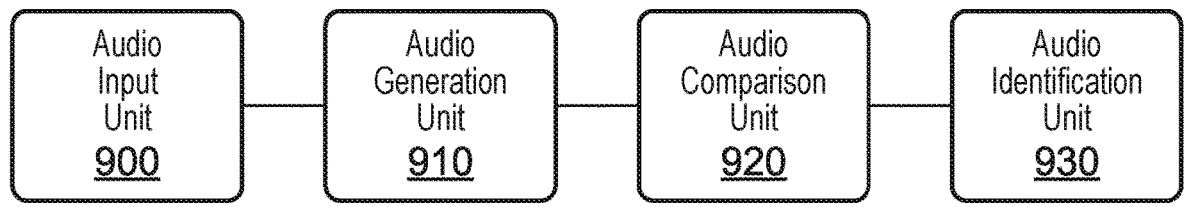
FIG. 9 schematically illustrates an audio separation unit.

FIG. 9 schematically illustrates an audio separation unit 800, as shown in FIG. 8. The audio separation unit 800 comprises an audio input unit 900, an audio generation unit 910, and an audio comparison unit 920. In some embodiments, the audio separation unit 800 may also comprise a sound source identification unit, a speech recognition unit, and/or an audio subtraction unit. These may be formed as separate units, or formed as a part of the audio input generation unit 900 or audio generation unit 910 as appropriate.

The audio input unit 900 is operable to receive an input composite audio track comprising two or more sound sources. As noted above, the input composite audio track may comprise live audio obtained using a microphone or pre-recorded audio, as appropriate for the application. The sound source may be an instrument or a person speaking, for example.

The audio generation unit 910 is operable to generate, using a model of a sound source, an approximation of the contribution of the sound source to the composite audio track. In some embodiments, the model comprises a machine learning algorithm as is described above.

If the sound source is an instrument, the model may comprise information about the sounds that are able to be generated by the instrument. Alternatively, if the sound source is a person speaking the model may comprise information about the range of sounds able to be made by the person. In some embodiments, the audio generation unit 910 is operable to use information about the recording environment in which the composite audio track is recorded as an input to the model.

The audio comparison unit 920 is operable to compare the generated audio to at least a portion of the composite audio track to determine whether the generated audio provides an approximation of the composite audio track that meets a threshold degree of similarity.

The audio identification unit 930 is operable to identify, when the threshold is met, the generated audio as a suitable representation of the contribution of the sound source to the composite audio track.

If present, the sound source identification unit is operable to identify one or more sound sources in the composite audio track. This can be used to select an appropriate model for the application, for example.

If present, the speech recognition unit is operable to identify words or commands in the person's speech. These may be used as voice commands for controlling processing of another application, for example, or for enhanced voice recording.

If present, the audio subtraction unit is operable to subtract the audio in the suitable representation from the composite audio track to generate a reduced audio track. This may be advantageous in that the audio generation unit 910 and audio comparison unit 920 may each be operable to use the reduced audio track and/or the generated suitable representation as an input to additional processing. This may reduce the total amount of audio within the track, enabling an improved comparison or generation process (for example, as the target may be more isolated).

The audio separation unit 800 is an example of a processor that is operable to identify the contribution of a sound source to a composite audio track, and in particular is operable to:

receive an input composite audio track comprising two or more sound sources;

generate, using a model of a sound source, an approximation of the contribution of the sound source to the composite audio track;

compare the generated audio to at least a portion of the composite audio track to determine whether the generated audio provides an approximation of the composite audio track that meets a threshold degree of similarity; and identify, when the threshold is met, the generated audio as a suitable representation of the contribution of the sound source to the composite audio track.

Figure 10:
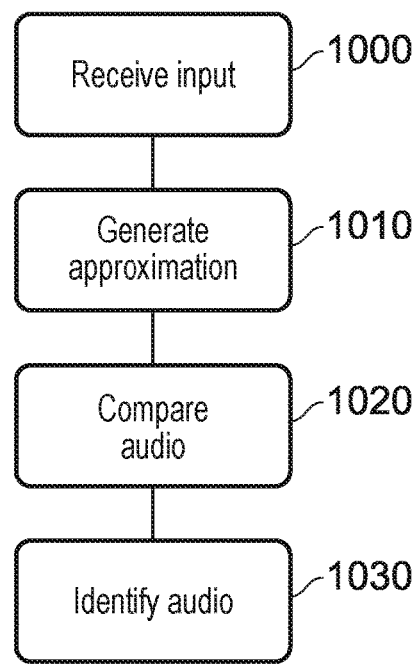
FIG. 10 schematically illustrates an audio separation method.

FIG. 10 schematically illustrates a method for identifying the contribution of a sound source to a composite audio track.

A step 1000 comprises receiving an input composite audio track comprising two or more sound sources.

A step 1010 comprises generating, using a model of a sound source, an approximation of the contribution of the sound source to the composite audio track.

A step 1020 comprises comparing the generated audio to at least a portion of the composite audio track to determine whether the generated audio provides an approximation of the composite audio track that meets a threshold degree of similarity.

A step 1030 comprises identifying, when the threshold is met, the generated audio as a suitable representation of the contribution of the sound source to the composite audio track.

While the above discussion has been centred upon a discussion of generating clean sounds that closely mimic the input audio, it is considered advantageous in some embodiments that the output audio intentionally varies from the input audio. This can create a greater variation in the sounds that are able to be provided in an arrangement; for example, a single sound may be generated manually and used as an input for a method that generates multiple variations on this. This can lower the audio repetition that is experienced by a user during an entertainment experience.

One particular example is that of generating an alternative version of an input music track; this may comprise a song that has modified lyrics or other speech component, or a modified instrumental component. Alternatively, or in addition, this may comprise a song that has other audio properties that have been modified, such as playback speed, volume (in particular, of one or more sound sources relative to others), and/or pitch. In some cases, these modifications may be generated so as to simulate the sound of a live recording of a song—for example, by reducing the production quality of the track and introducing one or more variations that may be expected (such as mistakes or personalisation).

Figure 11:
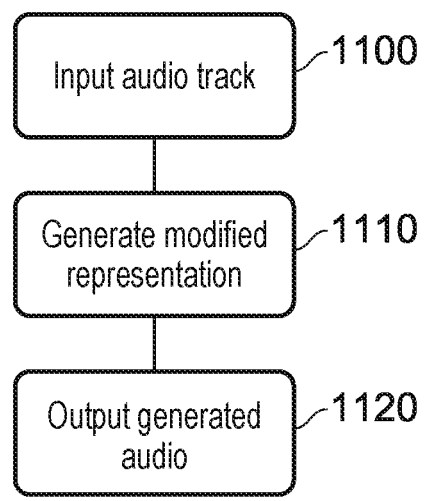
FIG. 11 schematically illustrates a method for generating output audio.

FIG. 11 schematically illustrates such a method for generating output audio.

At a step 1100, input audio is provided to the system performing the audio generation. While this audio may be any suitable audio input, including voices, instruments, and other sounds, the input of a studio-recorded song is considered here for exemplary purposes. The input audio may be provided in any suitable format, and may comprise additional data (such as metadata or tags) that identify one or more aspects of the audio or its constituent parts.

At a step 1110, a modified representation (comprising one or more generated audio tracks) of the input audio is generated. The generated audio is modified (relative to the input audio) so as to provide a different impression to the listener. This can include a variation in any suitable audio characteristic, such as volume, frequency, or duration, or can include a modification of the content of the audio itself. In the below description, references are made to modifications to the input audio (or the like); it should be understood that such references may refer to the generation of new audio that represents a modified version of the audio rather than necessarily a modification applied directly to the input audio.

For example, in the case of the input comprising a song the modifications may be provided so as to generate a representation of a live recording of that song. Live recordings of songs are known to sound different to studio recordings in a number of ways; for example, a more 'raw' sound may be expected from live audio due to the lack of post-processing and mixing that is traditionally performed in a studio. In addition to this, live music may often differ from the studio recordings in that incorrect notes may be played, and lyrics or instrumental portions may be varied (for example through mistakes, to engage an audience, or playing a full-length version instead of a radio edit). One example of this is in the case that a band uses the name of the town in which they are playing, either in a song or in a period between songs—this will of course differ depending on location.

In view of this, it is considered that modifications to the track (that is, the audio data representing the song) may be applied to the track as a whole (or at least parts of the output audio) such as changes to the volume or the duration of one or more segments of the track. In some cases this may comprise changes that undo or otherwise reverse the processing that was performed in the studio in generating the input audio initially.

Alternatively, or in addition, the modifications to the song may be performed upon one or more components of the track. For instance, the audio characteristics of the sound generated by each of one or more instruments/voices in the track may be adapted on an individual basis. This may be implemented using targeted mixing of the audio (such as by modifying specific frequencies only), by using a machine-learning based method as described below with reference to FIG. 12, or a combination of the two.

At a step 1120, the modified version of the audio may output to a listener; of course, in some cases the generated audio may instead be stored for later use or the like. This output may be provided in conjunction with video or image content, and may be provided using any suitable audio reproduction method or apparatus.

Figure 12:
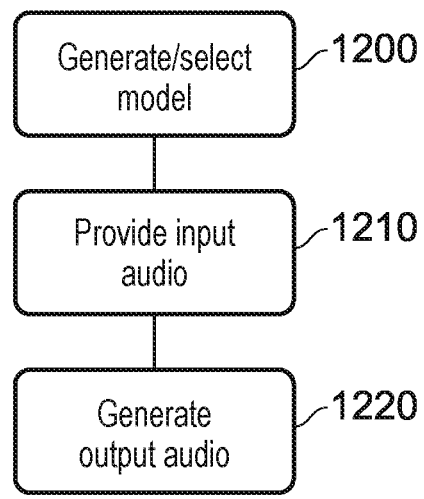
FIG. 12 schematically illustrates a method for generating modified audio that utilises one or more machine learning agents.

FIG. 12 schematically illustrates a method for generating modified audio that utilises one or more machine learning agents; this provides an example of a method that may be performed in step 1110 of FIG. 11 as described above. It is considered that the use of machine learning is not essential, and instead a model may be generated/selected that does not make use of machine learning elements, or utilises alternative machine learning methods that do not rely on reinforcement learning agents, however the below discussion is presented with reference to those embodiments which do utilise such methods.

At a step 1200 one or more machine learning agents and models (used to train the agents) are generated. Of course, this step may be performed in advance of the method of FIG. 11 and the step 1200 may instead comprise only the selection of an appropriate agent (or set of agents) for use in generating the modified audio. The generation of appropriate machine learning components is discussed below with reference to FIG. 13. A purpose of such models/agents is to be able to generate appropriate modifications to the input audio so as to generate the desired effect; for example, so as to modify the input audio so as to appear to be a live recording rather than a studio recording of a song.

The agents discussed here may be considered to be analogous to the models of instruments as discussed above (for example, with reference to FIG. 2); and they may be generated/configured in the same or a substantially similar manner. Of course, in order to achieve the effect of generating a variation of the input sound rather than a direct replica the agents/models must undergo a different training. For convenience, a discussion about the properties of the agents is provided below—although details provided above with respect to the models of instruments/sound sources may be equally applicable.

A single agent may be provided/selected in the case that a single audio element is used to generate the input audio—for example, if the input audio is a person speaking, or a single sound source. Similarly, a single agent may also be considered appropriate even in cases in which the input audio represents a more complex sound, such as a music track or a group of people talking.

In the case that multiple agents are provided, each may correspond to a particular aspect of the input audio. For example, each may correspond to a different sound source within the input audio (such as a number of different instruments). The agents may be used independently of one another to generate respective outputs, or the outputs of each of the agents may be used as inputs to one or more of the other agents, for example as a part of an iterative audio generation process.

At a step 1210 the input audio (as acquired in step 1100 of FIG. 11) is provided as an input to the agent or agents. In some embodiments, the input audio is divided into two or more suitable portions for provision to the agents—for instance, processing may be applied to the input audio so as to extract the sound associated with a single sound source (such as a particular instrument) only.

At a step 1220, output audio is generated using the agent(s) that the input audio has been provided to. The output audio is generated by each of the agents generating a representation of the corresponding sound source in the input audio; the output of such a step is one or more audio streams (or other representation of audio), each corresponding to a respective agent, that together provide a representation of the input audio.

For example, if the input audio is a song comprising voice and a single guitar, two agents may be defined/selected (that is, one agent corresponding to the voice and one corresponding to the guitar). The first agent is configured to generate audio to represent the vocals of the input audio, while the second agent is configured to generate audio to represent the guitar of the input audio.

This audio generation may be performed in any of a number of suitable ways. For example, each of the agents that are used may operate in isolation and the final output of each of the agents is combined into a single track.

Alternatively, an iterative approach may be taken in which the outputs of one or more agents is used to influence the outputs of one or more other agents. This may be advantageous when there are dependencies between the outputs (such as when a vocal variation is introduced to a song, and two or more agents correspond to vocalists or when the rhythm of the song has to be changed to match such a variation) such that the output of one agent should match or differ from the output of another agent.

For example, an iterative audio generation process may be used in which a number of discrete time steps are used. Each of the agents, at a time 't', may be provided with the output of one or more other agents up to a time 't−1'. The outputs of the other agents may therefore be used to constrain the outputs of a given agent, for example so as to match outputs or to ensure that variation does not increase by too much (at the risk of the output audio becoming unrecognisable compared to the input audio).

In some embodiments, it is considered that the audio generation of step 1220 is an iterative process in which the output is compared to the input audio in order to confirm that there is sufficient similarity so as to be considered only a variation of the input audio rather than entirely new audio. In the case that there is not a sufficient level of similarity, this may be fed back into the audio generation process to guide the generation of new audio that may be more similar. This can assist in balancing the desire for variations (to increase authenticity and the like) with that for recognition (to ensure that the audio can be identified correctly).

In some cases, it may be considered advantageous that each of the agents corresponds to a separate sound source, as the generated audio may be more easily localised in a virtual environment. Such features are discussed above, with reference to FIGS. 4-6; for example, if the input audio corresponds to a music track, then each of the instruments for which audio is generated (that is, each instrument for which an agent is used) may be associated so as to define an audio element-video element pair.

Figure 13:
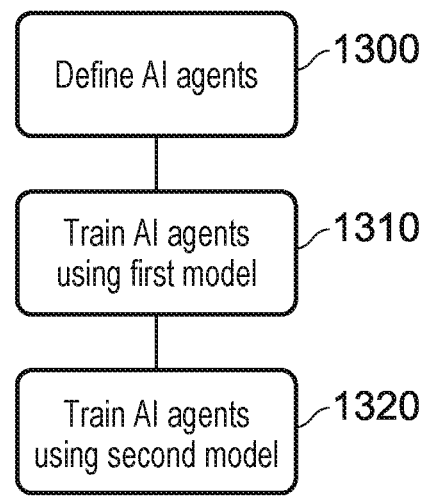
FIG. 13 schematically illustrates a method for developing a machine learning agent.

FIG. 13 schematically illustrates a method for developing a machine learning agent for use in the above methods, for example as a part of step 1200 of FIG. 12 as discussed above. While the discussion of this Figure is provided in the context of generating a live version of a studio-recorded track, this should not be seen as limiting—of course, this could be applied to any recorded sound. For example, audio from a movie may be adapted for presentation to a user so as to increase the realism when immersiveness is desired; the mixing that is applied to the movie audio may be optimal for the normal display of the movie, but it may not sound suitably realistic for a VR reproduction.

While presented as a single method, with the steps performed in succession and in a particular order, it should be understood that the order of the steps may be varied as appropriate and that the steps may be performed independently of one another (such as at different times, and/or at different locations) or in conjunction with one another (such as training using multiple models simultaneously/iteratively).

At a step 1300 one or more artificial intelligence (AI) agents are defined. These agents each represent one or more components that may contribute to input audio. For example, agents may be defined for each of a plurality of musical instruments. Alternatively, or in addition, the agents may correspond to one or more voices (which may be generic voices, or agents intended to mimic a specific person's voice) or any other sound sources.

In some embodiments, an agent may be defined that represents the noise of a crowd that is listening to the audio that is generated; this may assist with increasing the immersion of a user further. For example, crowd noise may be generated to be responsive to the content of the audio—the generated crowd noise may comprise cheers in response to crowd interactions, and applause at the end of a track, for example.

Each of these agents is defined so as to be able to produce audio that corresponds to the component for which it is defined; that is, an agent that is defined to represent a guitar is operable to identify and reproduce each (or at least a significant portion) of the notes that may be played using a guitar. An example of the generation of such an agent is discussed below, with reference to FIG. 14.

At a step 1310 one or more agents are trained using a model that differentiates between two different types of audio content; for example, live audio and recorded/generated audio. One example of this is crowd noises in a sports game—these may be pre-recorded, or computer generated, and may be suitable as background sound. However, in a more immersive setting, a user may become aware that they do not sound the same/similar to crowds that the user has experienced when attending live sports events. An objective of the training of the agents with this model is therefore to generate audio that more closely represents live content.

As has been discussed above, in some embodiments this model may differentiate between live recordings and studio recordings of music. For example, the model may be trained by providing pairs of live/studio recordings of the same track (or groups of live/studio recordings comprising more than one of each/either type of recording). Based upon this training data, the model may learn to identify the differences between the versions as discussed above—for example, acoustic differences relating to mixing (or a lack thereof), and changes in the content (such as wrong/changed notes, or crowd interaction).

The model used for training the agent in this step may be provided in any suitable form. In some embodiments, the model may be a discriminative model and reinforcement learning methods may be applied to train the agents using this model.

A discriminative model may be operable, in this example, to determine whether a generated input (generated by one or more agents) corresponds to either of the two sets of training data (the first set being live audio, and the second being studio audio). In this case, the objective would be to generate audio that is identified as being live audio with at least a threshold degree of success (or with at least a threshold degree of certainty). Such a determination may be based on any of a number of factors, such as audio properties (such as how raw the sound is) or environmental properties (does it sound like it was recorded in a music venue, or a recording studio—consider acoustics, audience noises and the like).

Reinforcement learning methods may be suitable in such cases, as these can enable an efficient generation of content that satisfies a given criteria. Such methods rely on providing a 'reward' to a system that generates a desired piece of content (that is, desired audio content); of course this does not need to be a reward in the traditional sense, rather it is an acknowledgement that the actions of the system have led to a positive outcome (such as a piece of content that appears to be a live recording of a song).

At a step 1320 one or more agents are trained using a model that differentiates between pairs of input audio (such as songs) in which the pairs either represent different versions of the same audio, or different audio altogether (for example, differentiating between a live song A/studio song A pair and a song A/song B pair). An objective of the training of the agents with this model is therefore to ensure that variations on the input audio do not stray too far from the original content; the output audio is intended to be a variation on the input audio that is recognisable, rather than a variation on the input audio that would be regarded as a new, entirely independent audio recording.

As above, the model used for training the agent in this step may be provided in any suitable form. In some embodiments, this model may also be a discriminative model and reinforcement learning methods may be applied to train the agents using this model. For example, in this step a discriminative model may be operable to determine whether a generated input (generated by one or more agents) corresponds to either of the two sets of training data (the first set being a live song A/studio song A pair, and the second being a song A/song B pair). In this case, the objective would be to generate audio that is identified (when paired with the input audio) as being a live/studio song pairing (rather than being different songs) with at least a threshold degree of success (or with at least a threshold degree of certainty). Such a determination may be made by performing any suitable comparison—for example, comparing the content (note-for-note, lyrics, and the like) of the audio.

Figure 14:
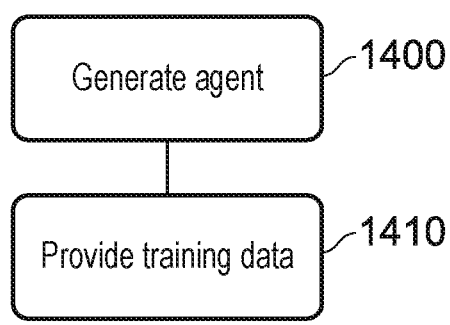
FIG. 14 schematically illustrates a method for generating a machine learning agent.

FIG. 14 schematically illustrates an exemplary method for generating a machine learning agent for training as described with reference to FIG. 13.

At a step 1400, information is provided that defines an agent's purpose and/or available outputs. In the example of a musical instrument, this may comprise the assignment of a class (such as 'guitar', or some other identifier) in addition to one or more sets of information defining or otherwise characterising that class. For example, this information may comprise the possible notes that can be produced by the instrument (or an analogous set of information, such as the phonemes that a human voice can produce), which form the 'building blocks' of more complex sound generation. Higher-level information may also be provided, such as relationships between different sounds that may be generated; for example, common combinations or identification of sounds which can/cannot be generated simultaneously and/or in quick succession.

For example, when modelling a piano as the sound source information such as the sound generated when pressing each key should be included, as well as other constraints upon the sound output such as the number of keys that can be pressed simultaneously (and the spread of keys that can be pressed simultaneously/within a threshold amount of time due to user hand size/movement speed).

Of course, there may be a number of variables that need to be taken into account when utilising such a model. For instance, if two people together play a single piano then this makes a substantial difference to the constraints upon the notes that are able to be played simultaneously or in quick succession. Further modifications to increase the specificity of the model, such as those relating to a particular instrument or musician, may also be considered in order to improve the ability of the model to approximate the desired audio.

For example, modifications may include the provision of details such as information about the instrument itself (make and model, or physical characteristics, for example), how it is tuned, and/or information about the output method associated with the instrument (such as through a particular amplifier that may cause the sound to be modified in a particular manner).

At a step 1410 training data that can be used to constrain the audio generation of the agent is input. For example, this may comprise the provision of audio samples (or other representations, such as sheet music) of real audio generated by the sound source which the agent is intended to represent. Such data can be used to identify the structure into which the notes may be formed to generate a particular output; for example, the agents may be able to learn which groups of notes are common, or regarded as being good/bad, so as to better be able to develop an understanding of the input sounds as a group.

Figure 15:
FIG. 15 schematically illustrates a system for generating audio content

FIG. 15 schematically illustrates a system for generating audio content in dependence upon an input audio track comprising audio corresponding to one or more sound sources. The system comprises an audio input unit 1500, an audio generation unit 1510, and an audio output unit 1520.

The audio input unit 1500 is operable to input the input audio track to one or more models, each representing one or more of the sound sources; these models may be any of those described above, for example those developed with one or more machine learning agents. As noted above, in some embodiments the input audio track is a song.

The audio generation unit 1510 is operable to generate, using the one or more models, one or more audio tracks each comprising a representation of the audio contribution of the corresponding sound sources of the input audio track, wherein the generated audio tracks comprise one or more variations relative to the corresponding portion of the input audio track. In embodiments in which the input audio track is a song, the generated audio tracks may simulate a live recording of the song. In such cases, it may be considered advantageous that an additional audio track is generated that is operable to simulate reactions of a live audience to the generated audio tracks representing the live recording of the song.

The audio generation unit 1510 is an example of a processor that is operable to generate audio content in dependence upon an input audio track comprising audio corresponding to one or more sound sources, the processor being operable to:

receive an input audio track comprising audio corresponding to one or more sound sources;

input the input audio track to one or more models, each representing one or more of the sound sources; and generate, using the one or more models, one or more audio tracks each comprising a representation of the audio contribution of one or more of the sound sources of the input audio track, wherein the generated audio tracks comprise one or more variations relative to the corresponding portion of the input audio track.

The audio output unit 1520 is operable to output the generated audio, for example to another device or directly via one or more loudspeakers or the like. Of course, such a feature is optional; there is no requirement for the generated audio to be output, as it may instead be stored locally for later use.

As discussed above, one or more of the models (used by the audio generation unit 1510) may be machine learning models; the models may comprise one or more reinforcement learning agents each corresponding to one or more sound sources in the input audio track. For instance, the model as referred to in the discussion of the audio generation unit 1510 may be the agents discussed above, or below with reference to FIG. 16.

These models may be trained so as to increase the difference between the input audio track and the generated audio tracks in a first set of characteristics, whilst not exceeding a threshold variation in a second set of characteristics. The first set of characteristics may be those that distinguish between a pre-recorded and a live version of an audio track, and the second set of characteristics may be those that identify two audio tracks as being different versions of the same audio content.

For example, the first set of characteristics may comprise identifiers relating to the presence of crowd noise, the external factors (such as acoustic qualities of the environment) present in the recordings, and the similarity of the content of the recordings. The second set of characteristics may relate to the note-for-note correspondence of the audio, and the content of the lyrics, for example. Of course, the characteristics may be determined freely for the appropriate application—and may not be predefined by an operator in the case of a machine learning based embodiment.

In some cases, the outputs of one or more models are provided as inputs to one or more other models at a time t in the output audio tracks, the outputs being generated up to a time preceding the time t. In effect, this feature enables the output of all models up to a time 't−1' (that is, a time that is one step of any appropriate duration behind the present time T) to be available to each model. This may enable variations to the input audio to be generated more consistently, for example.

As is described above, there are numerous types of variations that may be desired or expected. In the context of a song, these include both voluntary variations (such as a guitar solo, change in vocalist/instrument, crowd interaction, or customisation of lyrics) and involuntary variations (such as mistakes in playback of the song, or changes due to the acoustics of the playback environment or other external factors). Each of these may be replicated using one or more of the models—for example, an agent may be trained so as to occasionally switch the instrument that is used for a song, or to provide vocals that correspond to someone other than the usual singer). These variations may be implemented in embodiments of the present arrangement in that the one or more variations may comprise one or more of:

a modification to acoustic properties;
    a substitution of audio content;
    a addition/removal of audio content; and/or
    a personalisation of the audio content.

In some embodiments, the audio that is generated is expected to be provided with video content—for example, a video recording of the sound source (such as a music video including a band) or a computer-generated virtual environment. In such cases, each of the generated audio tracks may be associated with a position in a corresponding real and/or virtual environment; alternatively, or in addition, each of the generated audio tracks may be associated with a visual representation of a sound source within a virtual environment. This localisation of the generated audio may be performed in line with the discussion above, with reference to FIGS. 4-6.

Figure 16:
FIG. 16 schematically illustrates an audio generation unit.

FIG. 16 schematically illustrates an example of an audio generation unit, such as the audio generation unit 1510 shown in FIG. 15. In this example, the audio generation process utilises a machine learning based approach—a machine learning agent is generated and trained, before being used to generate output audio. This audio generation unit comprises an agent generation unit 1600, an agent training unit 1610, and an agent utilisation unit 1620.

The agent generation unit 1600 is operable to generate a machine learning agent, and/or any applicable machine learning models. As noted above, this may include the generation of an agent to represent each sound source within the input audio track. The generation of an agent may include the input of a number of different rules or constraints, in addition to (or instead of) a corpus of training data (such as a number of recordings of the audio output of the sound source). The agent generation unit may be suitable for implementing step 1300 of FIG. 13, for example.

The agent training unit 1610 is operable to provide training data to the generated agent, and to apply this training data in line with steps 1310 and 1320 of FIG. 13 (for example). As discussed above, this training data may comprise examples of audio data or other data that identifies characteristics of one or more groups of content.

The agent utilisation agent 1620 is operable to generate one or more output audio tracks using the trained agents, for example in line with step 1220 of FIG. 12 as described above.

Figure 17:
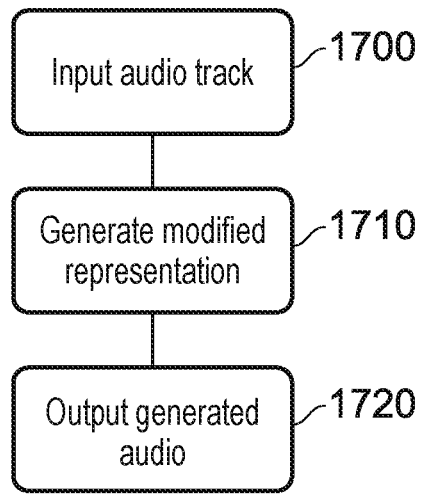
FIG. 17 schematically illustrates a method for generating audio content.

FIG. 17 schematically illustrates a method for generating audio content in dependence upon an input audio track comprising audio corresponding to one or more sound sources, the method comprising:

A step 1700 comprises receiving an input audio track comprising audio corresponding to one or more sound sources.

A step 1710 comprises inputting the input audio track to one or more models, each representing one or more of the sound sources.

A step 1720 comprises generating, using the one or more models, one or more audio tracks each comprising a representation of the audio contribution of one or more of the sound sources of the input audio track, wherein the generated audio tracks comprise one or more variations relative to the corresponding portion of the input audio track.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for generating audio content in dependence upon an input audio track comprising audio corresponding to one or more sound sources, the system comprising:
    an audio input unit operable to input the input audio track to one or more models, each input audio track representing one or more of the sound sources; and
    an audio generation unit operable to generate, using the one or more models, one or more audio tracks each comprising a representation of the audio contribution of the corresponding sound sources of the input audio track,
    wherein the input audio track is a studio recording of a song, and the generated audio tracks include one or more variations relative to corresponding portions of the input audio track that cause the generated audio tracks to sound like a live recording of the song instead of the studio recording of the song.

2. The system of claim 1, wherein at least one of:
    the one or more variations include reducing overall production quality of the studio recording of the song;
    the one or more variations include modifying lyrics of the studio recording of the song;
    the one or more variations include modifying one or more of vocal components and instrumental components of the studio recording of the song;
    the one or more variations include modifying a tempo of the studio recording of the song;
    the one or more variations include modifying relative volume levels between at least one of vocal components and instrumental components of the studio recording of the song;
    the one or more variations include modifying a pitch of one or more vocal components and/or instrumental components of the studio recording of the song;
    the one or more variations include generating an additional audio track that simulates reactions of a live audience to the generated audio tracks representing the live recording of the song.

3. The system of claim 1, wherein one or more of the models are machine learning models.

4. The system of claim 3, wherein the models are trained so as to increase the difference between the input audio track and the generated audio tracks in a first set of characteristics, whilst not exceeding a threshold variation in a second set of characteristics.

5. The system of claim 4, wherein the first set of characteristics are those that distinguish between a pre-recorded and a live version of an audio track, and the second set of characteristics are those that identify two audio tracks as being different versions of the same audio content.

6. The system of claim 3, wherein the outputs of one or more models are provided as inputs to one or more other models at a time t in the output audio tracks, the outputs being generated up to a time preceding the time t.

7. The system of claim 3, wherein the models comprise one or more reinforcement learning agents each corresponding to one or more sound sources in the input audio track.

8. The system of claim 1, wherein the one or more variations comprise one or more of:
   a modification to acoustic properties;
   a substitution of audio content;
   a addition/removal of audio content; and/or
   a personalisation of the audio content.

9. The system of claim 1, wherein each of the generated audio tracks is associated with a position in a corresponding real and/or virtual environment.

10. The system of claim 1, wherein each of the generated audio tracks is associated with a visual representation of a sound source within a virtual environment.

11. A method for generating audio content in dependence upon an input audio track comprising audio corresponding to one or more sound sources, the method comprising:
   receiving an input audio track comprising audio corresponding to one or more sound sources;
   inputting the input audio track to one or more models, each input audio track representing one or more of the sound sources; and
   generating, using the one or more models, one or more audio tracks each comprising a representation of the audio contribution of one or more of the sound sources of the input audio track,
   wherein the input audio track is a studio recording of a song, and the generated audio tracks include one or more variations relative to corresponding portions of the input audio track that cause the generated audio tracks to sound like a live recording of the song instead of the studio recording of the song.

12. A non-transitory machine-readable storage medium which stores computer software which, when executed by a computer, causes the computer to perform a method for:
   receiving an input audio track comprising audio corresponding to one or more sound sources;
   inputting the input audio track to one or more models, each input audio track representing one or more of the sound sources; and
   generating, using the one or more models, one or more audio tracks each comprising a representation of the audio contribution of one or more of the sound sources of the input audio track,
   wherein the input audio track is a studio recording of a song, and the generated audio tracks include one or more variations relative to corresponding portions of the input audio track that cause the generated audio tracks to sound like a live recording of the song instead of the studio recording of the song.

* * * * *